United States Patent [19]

Shapler et al.

[11] Patent Number: 4,890,994
[45] Date of Patent: Jan. 2, 1990

[54] APPARATUS FOR FORMING A PARISON WITH A VIEW STRIPE

[75] Inventors: Thomas A. Shapler, Bowling Green, Ohio; Thomas R. Buehler, Adrian, Mich.; Michael Hirschberger, Sylvania, Ohio

[73] Assignee: Hoover University, Inc., Ann Arbor, Mich.

[21] Appl. No.: 251,698

[22] Filed: Sep. 30, 1988

[51] Int. Cl.4 ............................................. B29C 47/22
[52] U.S. Cl. .................................. 425/131.1; 215/1 C; 264/209.8; 264/540; 425/462; 425/466; 425/467; 425/532; 428/34.1
[58] Field of Search ................... 425/532, 131.1, 133.1, 425/462, 466, 467, 72.1, 326.1, 387.1; 264/173, 540, 541, 177.2, 209.1, 209.8; 215/1 C; 428/34.1, 36.92

[56] References Cited

U.S. PATENT DOCUMENTS

| | | | |
|---|---|---|---|
| 2,808,617 | 10/1957 | Terracini et al. | 425/462 |
| 3,417,675 | 12/1968 | Ausnit | 264/22 X |
| 4,038,017 | 7/1977 | Langecker | 425/467 X |
| 4,152,104 | 5/1979 | Przytulla et al. | 425/467 X |
| 4,279,851 | 7/1981 | Lord et al. | 425/467 X |
| 4,297,092 | 10/1981 | Goron | 425/532 X |
| 4,789,318 | 12/1988 | Ehritt | 425/467 X |
| 4,802,833 | 2/1989 | Shapler | 425/532 X |

Primary Examiner—Richard L. Chiesa
Attorney, Agent, or Firm—Harness, Dickey & Pierce

[57] ABSTRACT

Apparatus for blow molding plastic containers with a longitudinal view stripe of a transparent resin in the side wall for visually monitoring the level of the contents of the container. The apparatus includes a plurality of die heads each of which includes a mandrel sleeve having a diverter for directing the flow of a pigmented resin around the mandrel sleeve to form a tubular parison, and for inserting a longitudinal stripe of a clear resin into the pigmented resin. The container mold halves are positioned relative to the parison such that the view stripe is located on the parting line of the mold halves such that the length of the view stripe along the top and bottom walls of the container is controlled.

12 Claims, 6 Drawing Sheets

APPARATUS FOR FORMING A PARISON WITH A VIEW STRIPE

BACKGROUND AND SUMMARY OF THE INVENTION

This invention relates generally to blow molding machines and more particularly to a blow molding apparatus for producing a container with a translucent view stripe on the mold part line on the container.

Plastic containers, such as motor oil containers, are generally made of an opaque colored plastic resin to provide product identification for consumers. A disadvantage of opaque containers is that it is not possible to visually monitor the level of the container contents. One solution for ascertaining the level of contents in an opaque plastic container is to form the container with a vertical stripe of a translucent plastic resin in the side wall of the container. In this invention the opaque containers are provided with translucent plastic view stripes on the mold part lines on the containers. The location of the view stripe on the container part lines enables the manufacture of containers with view stripes confined to the side wall. This avoids the unusual look of having stripes running through the top and bottom of the container where, in many cases, such stripes are useless.

An accumulator head for a blow molding machine for producing storage drums having a view stripe is disclosed in copending patent application Ser. No. 170,784 filed Mar. 21, 1988 now U.S. Pat. No. 4,802,833, issued Feb. 7, 1989, and commonly assigned.

It is an object of this invention to provide an improved blow molded container with a view stripe on the part line and apparatus for making such a container on existing blow molding machinery, such as reciprocating screw type blow molding machines.

It is a further object of the invention to provide a machine in which the view stripe can be accurately positioned in the parison of opaque plastic from which the container is formed.

The apparatus of this invention utilizes a multi-cavity die head assembly for producing multiple parisons each having a translucent view stripe through the wall of the parison. A manifold assembly is used to supply a primary and a secondary resin to each of the die heads. A primary reciprocating screw extruder is used for extruding a primary resin which is pigmented and opaque. A secondary reciprocating screw extruder is used for extruding a secondary resin of the same or similar type as the primary resin only unpigmented such that it is translucent.

The primary and secondary resins are fed into the interior cavity of each die head at locations diametrically opposite each other. The mandrel sleeve is equipped with a diverter sleeve which divides the flow of the primary resin into two flow streams flowing in opposite directions around the mandrel sleeve. The diverter also directs the flow from a horizontal direction to a vertically downward direction. As the primary resin flows downward and around the mandrel sleeve, a vertical gap is formed between the two flows of primary resin at the opposite side of the mandrel sleeve from where the primary resin is fed into the die head.

A secondary unpigmented resin is inserted into the die head and directed downward into the gap between the primary resin forming a weld of the primary resin. As a result, a tubular parison is created having a vertical stripe of a translucent resin in the wall of the parison.

This tubular parison is then ejected through an annular outlet at the bottom of the die head. The blow mold is positioned below the die head outlet such that the mold halves can then be closed upon the parison. The mold halves are oriented relative to the parison such that the parting line between the mold halves is aligned with the view stripe of the parison. When blow air is injected into the mold to mold the parison to the desired shape, the view stripe is blown into engagement with the parting line, thereby forming a container in which the view stripe is on the parting line.

The advantage of placing the view stripe on the parting line of the mold halves is that the view stripe length can be limited to the side wall of the container. If not located at the parting line, the view stripe will continue across the top and bottom walls of the container to the center of the top and bottom walls.

In producing a bottle in which the fill opening is off center, the mold is shifted to one side after closing upon the parison. The blow pin is then extended into the fill opening of the bottle and the blow air injected into the bottle forcing the parison against the inner wall of the mold cavity to produce a bottle having a shape of the mold cavity.

A container is thus formed which includes a vertical view stripe of a translucent resin through the side wall of the container along the parting line of the two mold halves. By locating the view stripe on the mold parting line, the view stripe of the side wall can, in some cases, end up as flash extending above the side wall which is removed so that the view stripe conveniently ends at the upper end of the side wall. The molds can be oriented to produce the view stripe on either parting line of the container.

It is within the purview of this invention to use any suitable blow moldable plastic resin that can be utilized in both opaque and natural or translucent forms. In any blow molded container produced by this invention, the two plastic resins must be compatible to join together at the parison weld line. In one form, high density polyethylene for both the opaque and translucent resins provides a container with an excellent view stripe through which the container contents can be readily ascertained.

Further objects, features and advantages of the invention will become apparent from a consideration of the following description and the appended claims when taken in connection with the accompanying drawings.

DETAILED DESCRIPTION OF THE INVENTION

Figure 1:
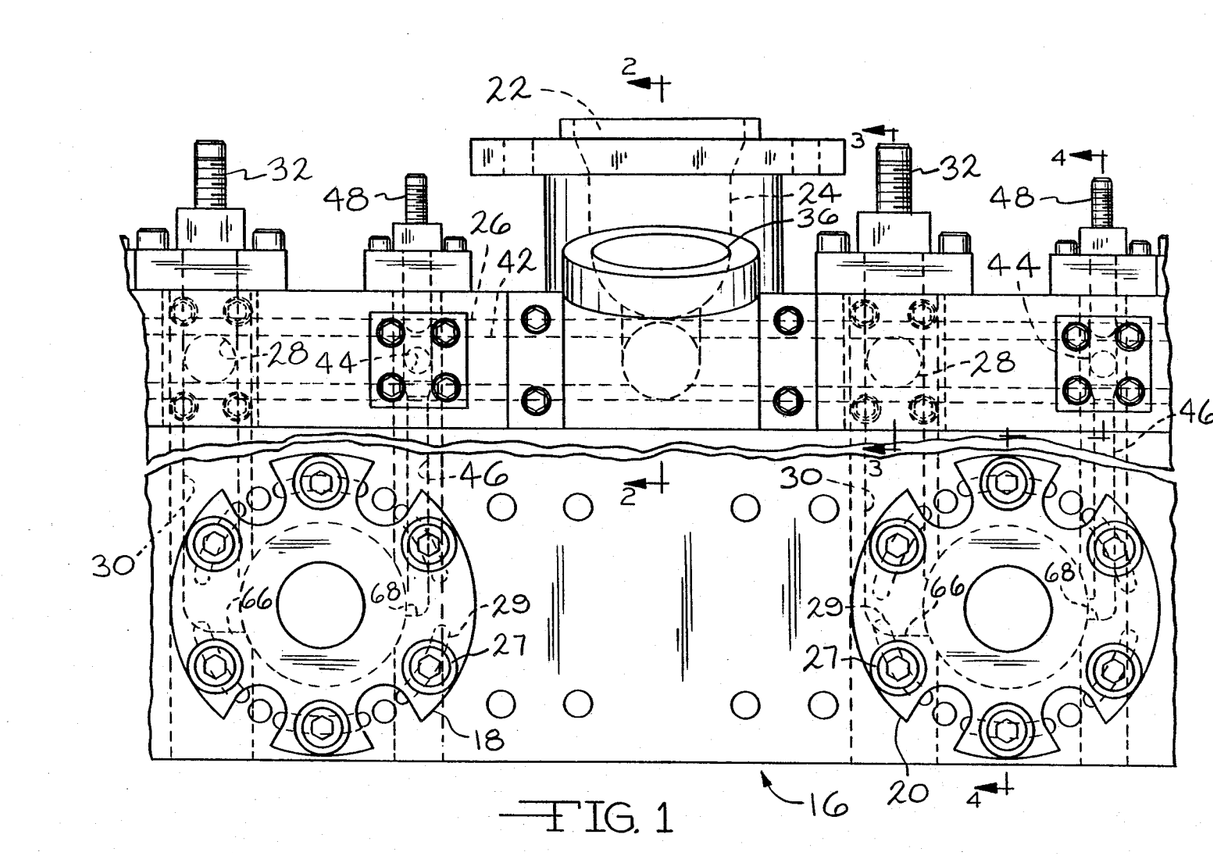
FIG. 1 is a plan view of a portion of the multiple die head and manifold assembly.

With reference to the drawings, the apparatus of this invention includes a die head manifold assembly, indicated generally at 16 in FIG. 1 which illustrates two side by side die head units, 18 and 20, of a multi-cavity die head assembly.

A primary reciprocating screw extruder (not shown) is attached to the primary plastic resin inlet 22. The primary extruder is used to extrude a pigmented plastic resin into the die head to form a parison. The pigmented plastic resin flows through conduit 24 to a horizontal primary flow channel 26 which runs longitudinally through the manifold assembly to allow the primary resin to flow to each end of the manifold.

Figure 3:
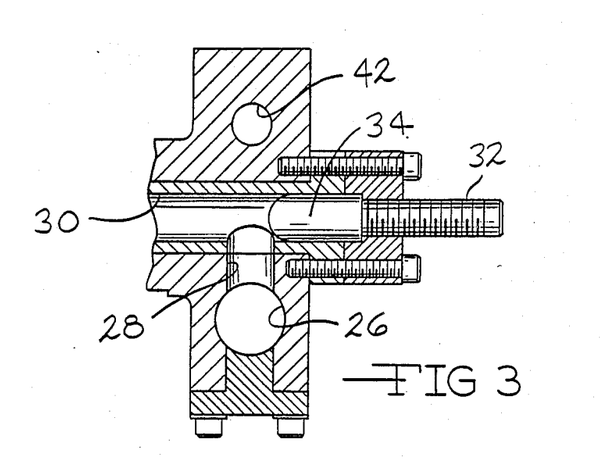
FIG. 3 is a sectional view of the primary sleeve and flow adjustment plug as seen from substantially the line 3—3 of FIG. 1.

Located at prescribed intervals along the flow channel 26 are vertical conduits 28 which direct the primary resin upward to horizontally positioned primary sleeves 30. Sleeves 30 are perpendicular to flow channel 26 and direct the flow of the primary resin to each of the die head units such as units 18 and 20. An adjustable choke screw 32 is operable to adjust the position of a flow plug 34 (FIG. 3) at the outer end of each primary sleeve 30 to balance the flow of the primary resin to each die head.

Figure 2:
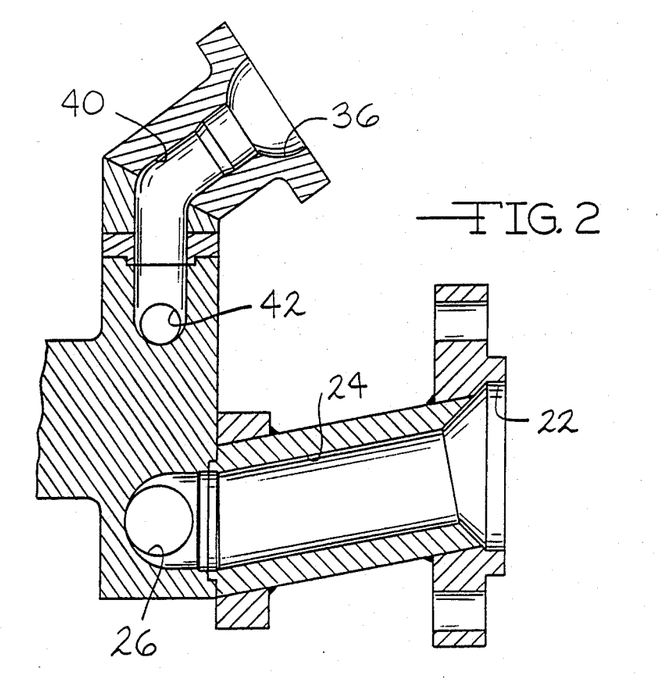
FIG. 2 is a sectional view of the primary and secondary resin inlets to the manifold as seen from substantially the line 2—2 of FIG. 1.

A secondary natural resin, which is not pigmented, is extruded by a second reciprocating screw extruder (not shown) positioned above the primary extruder and attached to a secondary resin inlet 36 (FIG. 2). The unpigmented resin, which is used to form the view stripe in the parison, flows through a conduit 40 to a horizontally positioned secondary flow channel 42 which is spaced above the primary flow channel 26. The secondary flow channel 42 allows the unpigmented resin to flow to each end of the manifold assembly.

At prescribed intervals along the secondary flow channel, vertical conduits 44 (FIG. 1) direct the unpigmented resin downward to horizontally positioned secondary flow sleeves 46 which direct the flow of the resin to the cavity in each die head unit. At the outer end of each secondary flow sleeve 46, an adjustable choke screw 48 (FIG. 4) and a flow plug 50 balance the flow of the secondary resin to each die head.

The die head manifold assembly thus supplies both the pigmented primary and the unpigmented secondary resins to each die head cavity in the multi-cavity blow molding machine. During automatic operation of the machine, an electrical signal is simultaneously given to both the primary and secondary extruders. The primary extruder is hydraulically powered forward pushing a shot of molten pigmented plastic resin into the die head assembly. The secondary extruder is also hydraulically powered for pushing a shot of molten unpigmented plastic resin of the same type as used in the primary extruder. This unpigmented, or translucent, resin is injected into the pigmented parison stream as it moves through the die head cavity as described below.

As seen in FIG. 1, the primary sleeve 30 and secondary sleeve 46 direct the primary and secondary resins respectively to diametrically opposite sides of the die head cavities.

Figure 4:
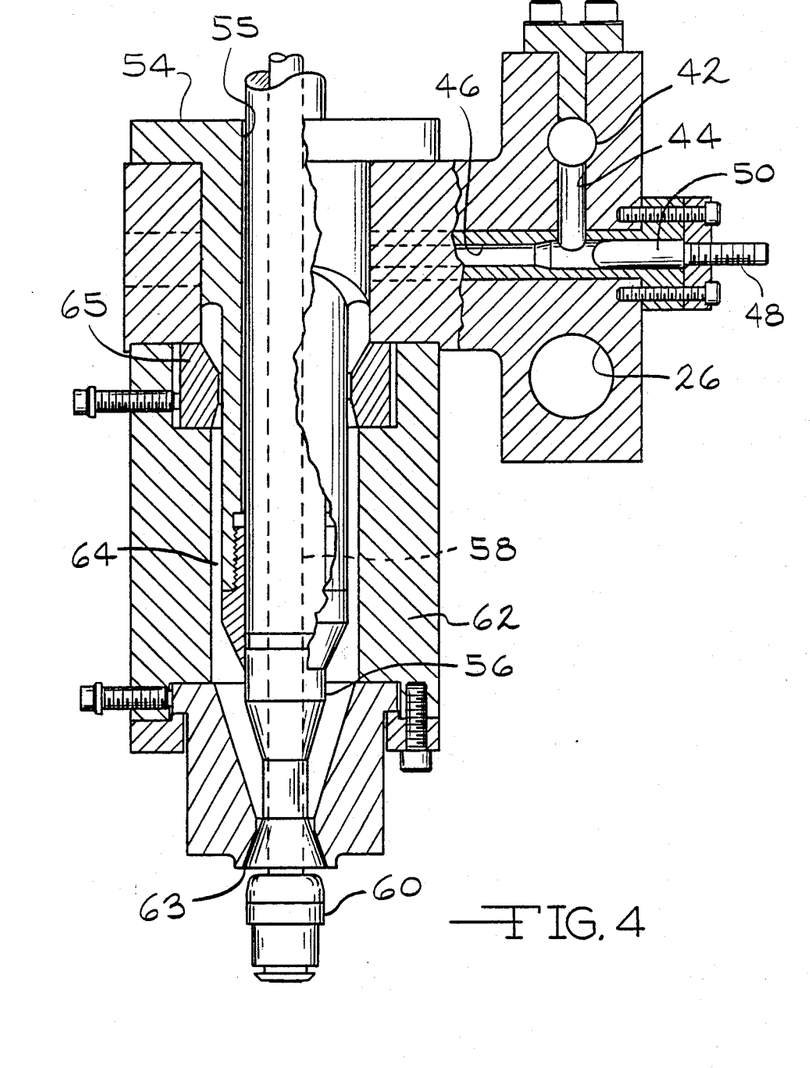
FIG. 4 is a vertical sectional view of the die head and the secondary sleeve and flow adjustment plug as seen from substantially the line 4—4 of FIG. 1.

The die head cavity, as shown in FIG. 4, is formed by a cylindrical mandrel sleeve 54 which has an axial bore 55 therethrough. A mandrel 56 extends through the bore 55. The mandrel 56 in turn has an air conduit 58 extending axially therethrough to a conventional blow pin 60 projecting below the die head. A die body 62 is supported in spaced relation around the mandrel sleeve 54 and mandrel 56 so as to define therewith an annular die head cavity 64 having an annular outlet orifice 63. An adjustment ring 65 is used to balance internal pressures within the die head cavities 64.

The primary resin flows from the primary sleeve 30 through an inlet orifice 66 into the cavity 64. Likewise, the secondary resin flows through the secondary flow sleeve 46 through an inlet orifice 68 into the cavity 64.

Figures 5, 6, 7:
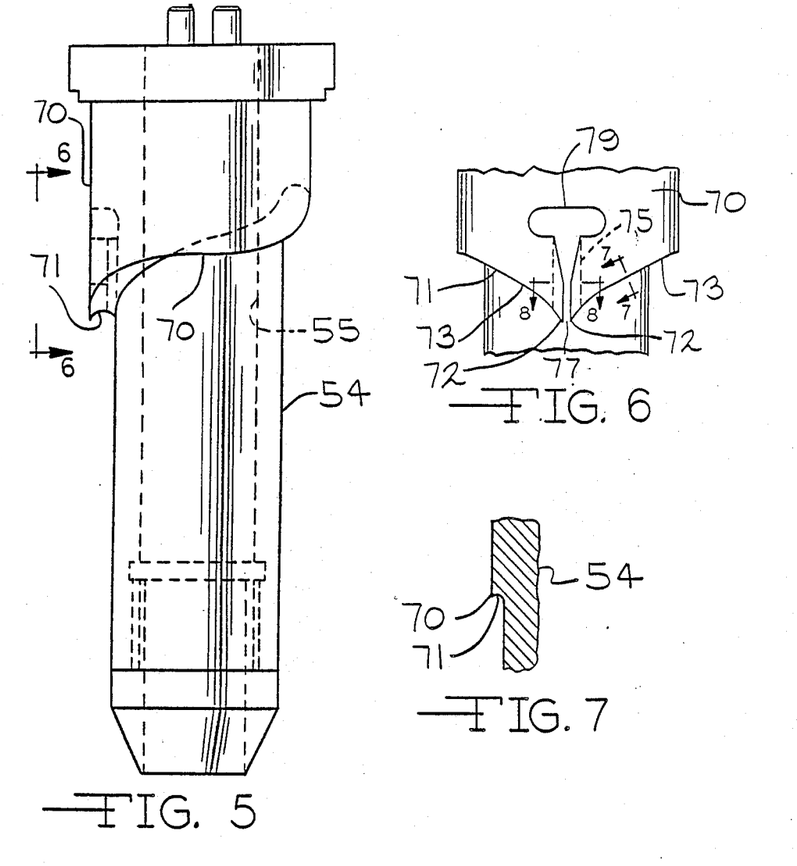
FIG. 5 is a side view of the mandrel sleeve and primary resin flow diverter in a position as viewed from the left in FIG. 4.
FIG. 6 is a fragmentary side view of the mandrel sleeve as seen substantially in the direction of arrows 6—6 of FIG. 5.
FIG. 7 is a fragmentary sectional view as seen from substantially the line 7—7 in FIG. 6.

The mandrel sleeve 54, illustrated in FIG. 5, is used to combine the primary and secondary resins into a single parison flowing downward through the cavity 64. The mandrel 54 includes a radially outward extending diverter segment 70. The diverter segment 70 has a surface 71 which faces axially downward toward the annular outlet orifice. The surface 71 has two downwardly curved and inclined sections 73 which terminate in horizontally spaced edges 72 which define a gap 77 therebetween which is diametrically opposite primary inlet 66 and axially below secondary inlet 68. Surface 71 defines an arcuate flow path for the primary resin. As the primary resin flows through inlet orifice 66 into the cavity 64, the flow of the resin is divided in two streams which flow circumferentially around the mandrel sleeve in both directions from the inlet orifice 66.

The surface 71 directs the flow of the primary resin from the horizontal flow direction in sleeve 30 to a vertical flow direction downward in cavity 64. The divided flow streams of the primary resin, flow around the mandrel sleeve to a position at the opposite side of the mandrel sleeve from the inlet orifice 66 to positions below the edges 72.

Figure 8:
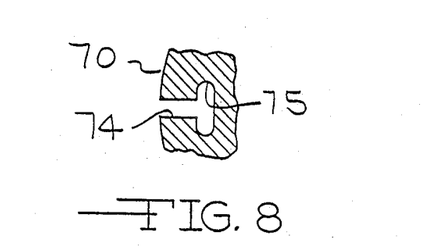
FIG. 8 is a fragmentary sectional view as seen from substantially the line 8—8 of FIG. 6.

The diverter 70 includes a generally V-shaped passage 74, shown in FIG. 6, between the two edges 72. The V-shaped passage 74 is shaped, in cross section, so that it has a wide portion 75 (FIG. 8) located radially inwardly of the outer surface of slot 74 forming a substantially T-shaped section. Likewise, the passage 74 (FIG. 6) also has a wider inlet portion 79 at its upper end which is in communication with secondary resin inlet orifice 68. Passage 74 defines a conduit for the flow of the secondary resin from the sleeve 46 to the die head cavity 64 and the large inlet insures that the passage 74 will be filled at all times.

As the secondary resin flows through orifice 68 into the passage 74, the resin is directed downward through gap 77 past the edges 72 into the flow of the primary resin at the point where the divided flow streams of primary resin flow toward each other below the gap 77. In this manner, the secondary unpigmented resin is joined into the tubular parison of primary resin so as to form the weld line between the divided primary resin flow streams.

Figures 9, 11:
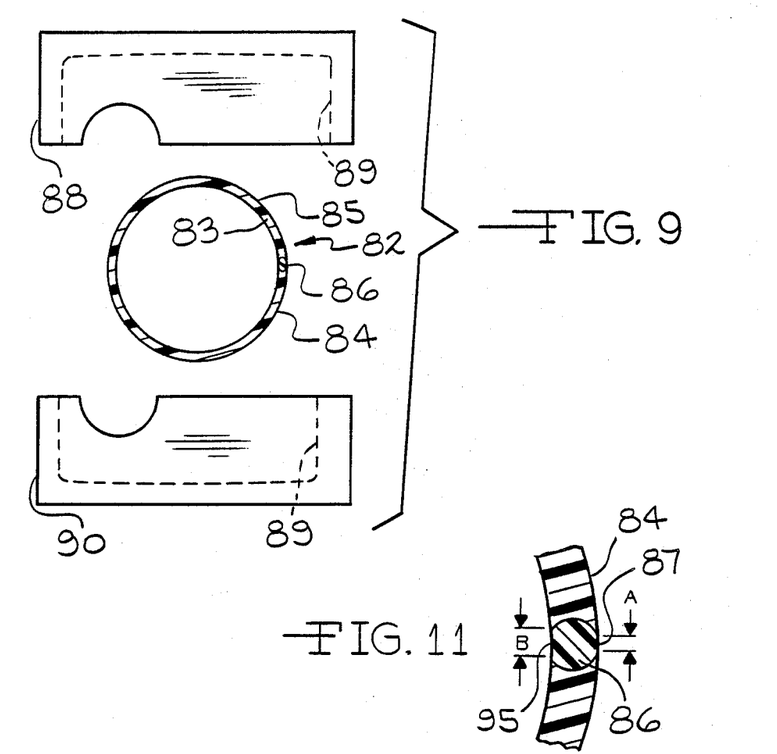
FIG. 9 is a sectional view of the parison shown in relation to the mold halves, the parison having been formed with the view stripe on the right hand side of the parison as viewed in this figure.
FIG. 11 is an enlarged sectional view of a portion of the parison as seen from substantially the line 11—11 of FIG. 10 illustrating the view stripe in the parison wall.

The tubular parison 82 has an inner surface 83 and an outer surface 85 (FIG. 9). To form a clearly defined view stripe with sharp edges, the circumferential width of the view stripe at the inner surface 83 must be equal to or greater than the view stripe width at the outer surface 85. To assure that the inner surface of the view stripe is wider than the outer surface, the passage 74 is shown as being substantially T-shaped in FIG. 8. However, it is to be understood that passage 74 can be of other shapes in which the inner surface is wider than the outer surface.

If passage 74 has a constant width, the inner surface of the view stripe would be narrower than the outer surface. This is because the primary plastic flowing around the mandrel sleeve on the inner surface has a shorter distance to travel than the plastic of the outer surface. Therefore, if the passage 74 is not wider at this inner surface, the resulting view stripe will be narrower at the inner surface than at the outer surface resulting in clouded edges of the view stripe. The clouded or hazy edges are due to the edges of the opaque side wall of the container being visible through the view stripe.

Another important factor in producing a view stripe with clearly defined edges is proper alignment of the inner and outer surfaces of the stripe so that neither of the opaque edges is visible when looking into the container through the view stripe. If the passage 74 is not positioned diametrically opposite the primary resin inlet 66, the outer surface of the view stripe will be offset from the inner surface. This results in the view stripe having one well defined edge and one clouded edge. The well defined edge will be the edge which is closest to the primary resin inlet 66. To provide for proper alignment, the mandrel sleeve 54 can be rotated to adjust the position of the passage 74. The upper portion 79 of passage 74 is in communication with the secondary inlet 68 and is circumferentially wider than the remainder of passage 74 to allow for rotation of the mandrel sleeve and maintain communication with the resin inlet 68. The mandrel sleeve 54 is mounted to the die body 62 by bolts 27 (FIG. 1). Slots 29 in the die body 62 accommodate the rotation of the mandrel sleeve.

A cross section of the diverter segment 70 is shown in FIG. 7 to illustrate the upwardly concave shape of the surface 71 of the diverter 70.

The simultaneous operation of the primary and secondary extruders forces the molten plastic resins to flow into the die head cavity 64 forming a tubular parison which flows through the annular outlet orifice 80 at the bottom of the die head. The tubular parison is formed of the pigmented primary resin with a longitudinal stripe of the secondary natural resin extending radially through the parison wall so as to form a view stripe in the parison. The parison, as it flows out of the outlet 80, encircles the blow pin 60 extending from the lower end of the mandrel 54.

FIG. 9 illustrates a parison 82 formed of the primary resin 84 with a narrow longitudinal section comprised of the secondary natural resin 86 which extends radially through the parison wall. When the parison 82 has been extruded from the die head of a sufficient length to form a blow molded container, the primary and secondary extruders have completed their forward strokes, thereby discontinuing the discharge of the plastic from the outlet orifice 80. The two mold halves 88 and 90, shown in FIG. 9 in the open position, are moved together enclosing the parison in the mold cavity 89. The orientation of the mold halves relative to the view stripe 86 in the parison results in the production of the final container in which the view stripe 86 is formed along the parting line between the two mold halves 88 an 90.

Figure 10:
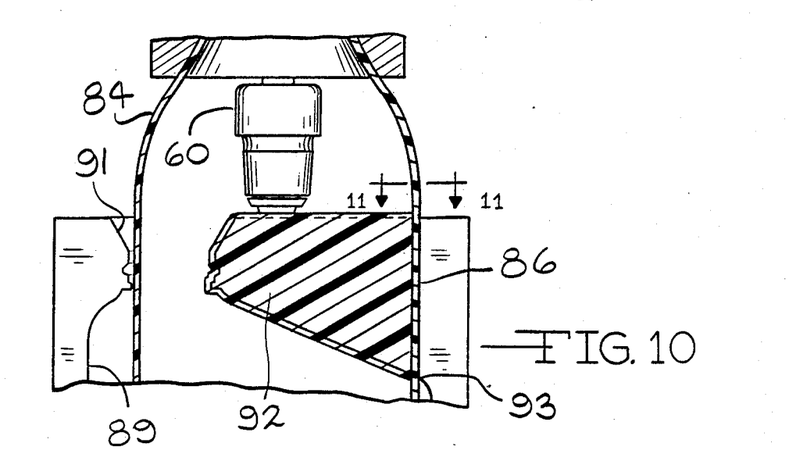
FIG. 10 is a sectional view of the parison after closure of the mold halves, also viewed with the view stripe to the right hand side of the parison.
Figures 12, 13, 14:
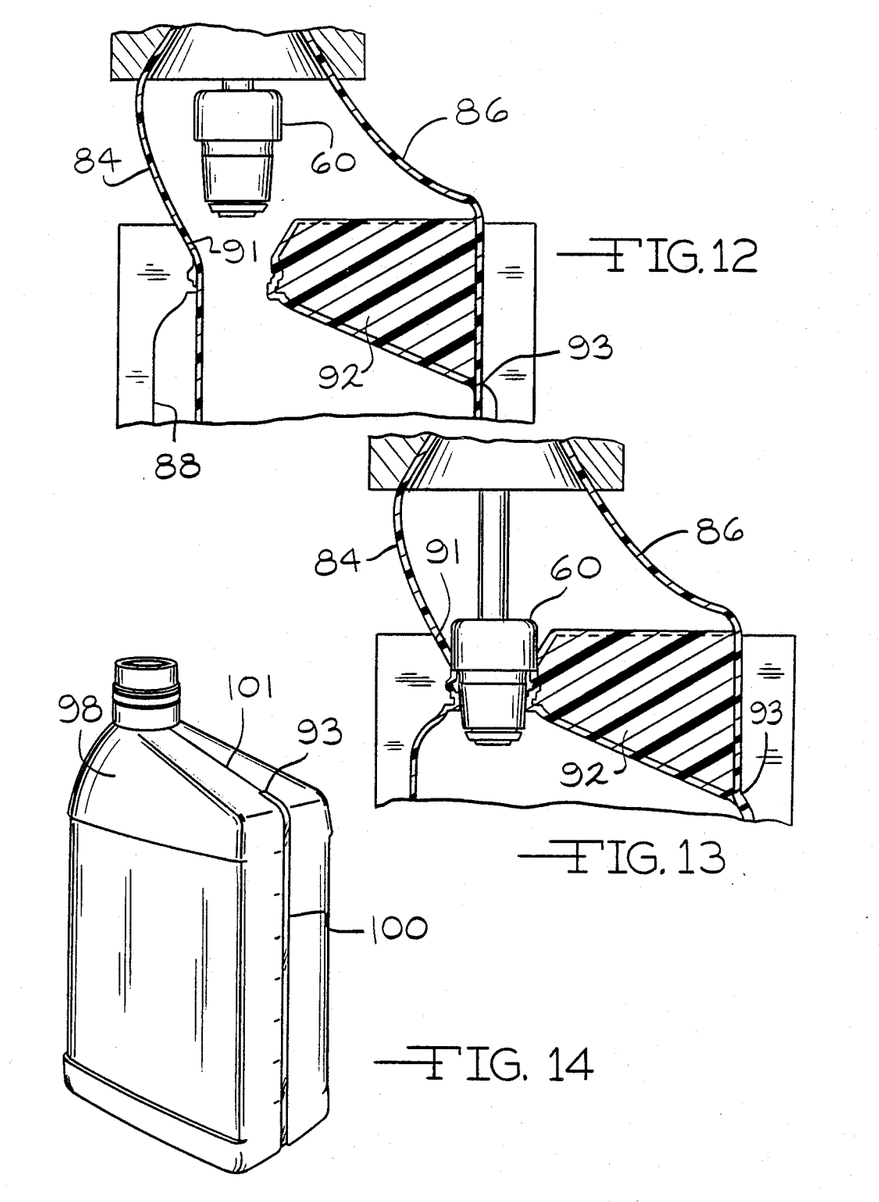
FIG. 12 is a sectional view of the parison similar to FIG. 11 with the mold shifted to position the blow pin above the container neck opening.
FIG. 13 is a sectional view similar to FIG. 12 with the blow pin extended into the container neck opening.
FIG. 14 is a perspective view of the finished container with a view stripe in the container side wall at the mold parting line.

FIGS. 10, 12 and 13 illustrate the parison and the mold after the mold has been closed. In FIG. 10, a section of flash 92 is formed between the two mold halves above the mold cavity 89 as the mold halves are closed upon the parison. Because the view stripe is located on the mold parting line, the outer vertical edge of the flash 92 includes the secondary, unpigmented resin 86 which forms the view stripe.

In the final container, the view stripe will only extend to the point 93 at the outer vertical edge of the flash. The extension of the view stripe along the top and bottom walls can thus be controlled as a result of locating the view stripe on the parting line.

The mold is then shifted to one side such that the neck portion 91 of the mold cavity is in alignment with the blow pin 60 (FIG. 12). After the mold is moved into this position, the blow pin is extended downward into the mold cavity so as to form the neck portion of the container (FIG. 13). Blow air is then injected through the blow pin into the interior of the mold cavity forcing the parison outwardly against the interior surface of the mold cavity thereby forming the finished container 98 as shown in FIG. 14.

FIG. 11 is a cross section of a portion of the parison showing the view stripe 86. To provide a view stripe having a uniform width, a uniform temperature in the shot of resin used to form the view stripe is maintained.

The relative temperatures and viscosities of the primary and secondary resins is also important in controlling the view stripe width and sectional shape. A higher viscosity for the secondary resin than the primary resin results in a view stripe of a generally elliptical shape as shown in FIG. 11. The pressure forcing the parison through the outlet orifice 63 causes the higher viscosity secondary resin to bulge outward forming the elliptical shape. The lower viscosity primary resin flows around the secondary resin at the inner and outer surfaces forming a vertical edge for the view stripe. In a preferred embodiment, the translucent resin is at a higher temperature than the opaque resin to minimize the intrusion of the translucent resin into the opaque resin. What is shown in FIG. 11 is only illustrative. Other satisfactory view stripes can be formed with less translucent resin intruding into the opaque resin than that shown in FIG. 11.

As discussed previously, the dimension A of the outer surface of the view stripe 87 must be smaller than the dimension B of the inner surface of the view stripe 95 to produce well defined edges of the view stripe. In addition, the outer surface 87 must be aligned radially outward from the inner surface 95.

Container 98 is comprised primarily of an opaque plastic resin with a longitudinal view stripe 100 along the parting line 101 between the two mold halves. The view stripe enables visual monitoring of the level of the contents of the container.

From the above description it is seen that this invention provides a container 98 with a translucent view stripe 100 extending along the parting line of the container. The view stripe 100 is a clearly defined vertical line on the container 98 and is it not clouded by the opaque plastic from which the container body is molded. The apparatus of this invention ensures these advantages in the container 98 and enables manufacture of the container from plastic supplied intermittently to the die head units 18 and 20 from reciprocating screw extruders in common use.

What is claimed is:

1. Apparatus for producing a tubular parison of a first plastic resin having a longitudinal stripe for a second plastic resin extending radial through said tubular parison, said parison having inner and outer surfaces, comprising:
   a die head having a longitudinal axis;
   a mandrel sleeve within said die head and spaced therefrom to define a tubular cavity;
   an annular outlet orifice from the cavity at one end of the die head;
   a first inlet for directing a first plastic resin into the side of said cavity;
   means operatively associated with said mandrel sleeve for dividing said first resin into two flow streams which flow through said cavity in opposite directions around said mandrel sleeve and toward said annular outlet orifice;
   a second inlet for directing a second resin into said cavity on the opposite side of said cavity from said first inlet; and
   means operatively associated with said mandrel sleeve for diverting said second resin downward between said two first resin flow streams to form a weld of said second resin in a circumferential direction between the two first resin flow streams thereby forming a tubular parison in said cavity of said first resin having a longitudinal stripe of said second resin extending radially through the parison.

2. The apparatus of claim 1 further comprising:
   means for forming said stripe of the second resin with a circumferential width at said inner surface larger than at said outer surface.

3. The apparatus of claim 1 wherein said mandrel sleeve includes means for positioning the stripe of said second resin within the first resin.

4. The apparatus of claim 3 wherein said mandrel sleeve is adjustably mounted within said die body so that the mandrel sleeve can be rotated to adjust the position of the second resin within the first resin.

5. Apparatus for producing a tubular parison of plastic resin, comprising:
   a generally cylindrical mandrel sleeve having an axis;
   a die body supported in spaced relation around said mandrel sleeve defining an annular cavity therebetween having an annular outlet orifice at one end of said die body and mandrel sleeve;
   a first inlet orifice in said die body for passage of a first plastic resin into said cavity;
   a second inlet orifice in said die body for passage of a second plastic resin into said cavity;
   diverter means on said mandrel sleeve in communication with said first inlet orifice for dividing the flow of said first resin into two flow streams directed circumferentially around said mandrel sleeve in opposite directions to the opposite side of said mandrel sleeve from said first inlet orifice;
   said diverter means also including means for diverting the flow of said first resin to a direction generally parallel to said axis;
   said diverter means also including means in communication with said second inlet orifice for diverting the flow of said second plastic resin in an axial direction between the two flow streams of said first resin on the opposite side of said mandrel sleeve from said first inlet orifice forming a weld joining the divided flow streams of said first plastic resin thereby forming a hollow column of plastic resin within said cavity with a portion of said column formed of said second resin, said column flowing out of said cavity through said annular outlet orifice forming a tubular parison of resin having a stripe of said second resin radially through said parison wall.

6. The apparatus of claim 5 wherein said second inlet is diametrically opposite said first inlet.

7. The apparatus of claim 5 wherein said diverter means defines a radially extending surface facing axially downward toward said outlet orifice, said surface in communication with said first inlet orifice and defining arcuate flow paths circumferentially around said mandrel sleeve in each direction inclined axially downward toward said outlet orifice, said surface directing the flow streams of said first resin to a location diametrically opposite said first inlet orifice and axially downward from said second inlet orifice.

8. The apparatus of claim 7 wherein said surface was an upwardly concave cross section.

9. The apparatus of claim 7 further comprising a passage in said diverter means, said passage having an inlet in communication with said second inlet orifice and said passage having an outlet directed downwardly on the opposite side of said mandrel sleeve from said first inlet orifice, said passage for directing said second resin between the flow streams of said first resin forming the weld joining the flow streams of the first resin.

10. The apparatus of claim 9 wherein the radially inner portion of said passage is circumferentially wider than the radially outer portion of said passage.

11. The apparatus of claim 10 where said passage is T-shaped.

12. The apparatus of claim 7 wherein said mandrel sleeve is adjustably mounted within said die body such that said mandrel sleeve can be rotated to adjust the position of said second resin in said parison.

* * * * *

UNITED STATES PATENT AND TRADEMARK OFFICE
CERTIFICATE OF CORRECTION

PATENT NO. : 4,890,994

DATED : January 2, 1990

INVENTOR(S) : Thomas A. Shapler, Thomas R. Buehler, Michael Hirschberger

It is certified that error appears in the above-identified patent and that said Letters Patent is hereby corrected as shown below:

On the Title Page, "University" should be --Universal--.

Column 1, line 26, after "having", insert --view--.

Column 7, line 12, claim 1, "for" should be --of--.

Column 8, line 53, claim 11, "where" should be --wherein--.

Signed and Sealed this

Nineteenth Day of November, 1991

Attest:

HARRY F. MANBECK, JR.

*Attesting Officer*     *Commissioner of Patents and Trademarks*